United States Patent

Hendriks et al.

[11] Patent Number: 5,131,883
[45] Date of Patent: Jul. 21, 1992

[54] FOOD EMULSION CASING END-CLOSURE

[75] Inventors: Ivo G. M. Hendriks, Overpelt; Johan Kwanten, Bocholt, both of Belgium

[73] Assignee: Teepak, Inc., Westchester, Ill.

[21] Appl. No.: 601,153

[22] Filed: Oct. 22, 1990

[51] Int. Cl.⁵ ............................................. A23C 7/02
[52] U.S. Cl. ...................................... 452/21; 452/22; 452/26
[58] Field of Search .................. 452/21, 22, 25, 26

[56] References Cited

U.S. PATENT DOCUMENTS

| | | | |
|---|---|---|---|
| 3,274,005 | 9/1966 | Alsys | 99/176 |
| 3,865,954 | 2/1975 | Tums et al. | 426/140 |
| 3,882,252 | 5/1975 | Winkler | 426/140 |
| 3,892,869 | 7/1975 | Sheridan et al. | 426/138 |
| 3,942,568 | 3/1976 | Stemmler | 150/1 |
| 3,942,569 | 3/1976 | Becker et al. | 150/1 |
| 4,075,938 | 2/1978 | Martinek | 9.3/84 |
| 4,411,048 | 10/1983 | Green | 17/49 |
| 4,428,402 | 1/1984 | Kubo et al. | 138/118.1 |
| 4,525,984 | 7/1985 | Kollross | 53/483 |
| 4,693,280 | 9/1987 | Beardsley | 138/118.1 |
| 4,792,047 | 12/1988 | Wood et al. | 264/138 |

Primary Examiner—Bruce M. Kisliuk
Assistant Examiner—Lawrence Cruz
Attorney, Agent, or Firm—Michael L. Dunn; R. Lawrence Sahr; Robert P. Simpson

[57] ABSTRACT

A food emulsion casing end-closure, and the method of making it, are disclosed. The end-closure is formed of a twist knot through which an air escape aperture is extended. The twist knot forms part of a wadding which is stuffed into the bore of a shirred casing stick and interference fitted therewith. The wadding acts as a shock absorber for the initial shock of extruded food emulsion and serves as means to enhance the consistency of that initial portion of extruded food emulsion. The twist knot is sufficiently tight that it can serve as a permanent end-closure or it may readily be opened by untwisting. Also provided is a lock means for maintaining the twist knot as such.

24 Claims, 11 Drawing Sheets

FOOD EMULSION CASING END-CLOSURE

FIELD OF THE INVENTION

The present invention relates generally to the field of packaging prepared food emulsions, more specifically to casings used for such packaging and particularly to end-closures for such casings, and the formation thereof, for use in relation to automated food emulsion stuffing equipment and otherwise.

BACKGROUND OF THE TECHNOLOGY

Food emulsions, for example sausage-type foods and various cheeses, are packaged by pumping them under pressure into casings of various sizes and codes. One form of casing that is used to package such food emulsions, e.g. meat emulsions or cheese emulsions, is a shirred casing made of material which may or may not be edible. The casing is formed into a tubular section which may be, for example, one hundred feet or more in un-shirred length. This relatively long length of casing is shirred into what is known in the industry as a shirred stick. The shirred stick may be of a length, for example, in a range of about 10 inches to about 18 inches. In conventional practice, the shirred stick is delivered to the food processor who typically will use it, for example, by sliding it over the elongated tubular horn of a food emulsion pump. The pump is then turned on and the food emulsion is forced through the horn. As the emulsion exits the horn, it enters the casing. The encased, packed food emulsion runs out continuously until the end of the casing material is reached, specifically, until the end of the shirred stick is reached. Thus, the casing is de-shirred as the food emulsion is extruded into it.

The casing material is relatively thin, in many cases being in the range of, for example, 0.0007 to 0.001 inches in wall thickness. The casing material may or may not be edible, for example, an edible casing being formed of collagen. The initiation of the process of stuffing the food emulsion into the casing or filling the casing, requires that the casing end be closed such that the pressure of the food emulsion will not just simply push through but instead will engage the end of the casing, thus pulling it and the balance of the casing alongwith the food emulsion as the food emulsion is extruded into the casing.

In the past, the emulsion stuffing machine operator, when changing casing sticks, would tie off, or in some other manner close, the end of the casing which was to first come into contact with the food emulsion. Or the operator could simply hold the end closed until sufficient food emulsion had been extruded into the casing to the point that extrusion would continue to de-shirr the casing off of the extrusion horn rather than push the food emulsion through the now-unheld end of the casing. In more recent times, it has been recognized that it is much more facile, reliable and economical if the shirred casing sticks are delivered from the manufacturer to the food processor with end enclosures already in place. Thus, the shirred casing stick with the enclosure in place can merely be slipped over the extrusion horn without concern for the tying-off, clamping, crimping or otherwise forming of an end-closure on the casing, tasks which formerly had to be undertaken by the food emulsion machine operator. The preference for shirred casing sticks with preformed end-closures has increased in direct relationship to the progressive development of food emulsion extrusion equipment; that development has progressed from the single extrusion horn machine to machines which have multiple extrusion horns and then to machines which are further automated such that a multiplicity of shirred casing sticks is loaded into the machine hopper with each of those sticks being automatically loaded onto the one or more horns of the extrusion machine. Furthermore, there have been additional developments of automated food emulsion stuffing equipment which have produced equipment and processes which do not use horns, but rather use other means for introducing the emulsion into the shirred casing sticks. Many of these recent developments of machines are extremely high speed, being capable of stuffing a shirred casing which, for example, on extension is 100 feet in length, in as short a period as 5 to 7 seconds.

In many of the food emulsion stuffing operations, the food emulsion is required to start up and stop every time extrusion is initiated into a new shirred casing stick and, respectively, when that casing stick has been expended and a succeeding new shirred casing stick is required. Because of such start up and stopping, the flow velocity and density of the initial portion of food emulsion, which, on start-up, is stuffed into the casing, is not always consistent with the balance of the rest of the encased emulsion. Thus, in many operations, this first portion is separated from the balance of the stuffed food emulsion, that first portion being recycled Because of this, in contemplating methods for closing the ends of food emulsion stuffing casings, consideration must be given to means of undoing or opening the end-closure to enable the easy extraction of this initial portion of food emulsion which then is recycled.

In other types of food emulsion stuffing operations, especially the automated processes used at present, and also those which are still considered manual but which entail multiple stuffing horns on a single food emulsion stuffing machine, it is possible to stuff casings with food emulsion such that even the initial end of the casing, with the first portion of food emulsion therein, is of sufficient density, consistency and size to be utilized. Thus in considering end-closures it is necessary to also incorporate the concept of end-closure permanency, in comparison to, for example, the hand held type of end-closure mentioned previously. Beyond this, consideration must be given to the strength of the end-closure itself. It must be sufficiently strong that the force and pressure of the food emulsion being extruded into it does not push out the end-closure. Another consideration in regard to end-closures for food emulsion casings is that some mechanism must be incorporated to release air which is trapped in the end as the food emulsion is extruded under pressure into the casing. Thus, it is considered an advantageous feature when end-closures can be formed which permit the escape of entrapped gases, but without the escape of any of the food emulsion.

The amount of casing material necessary to form an end-closure can be significant not only for cost reasons, regarding the amount of casing necessary to be used, but also in regard to the danger of excess casing material being trapped or entangled in braking or sizing equipment normally used to regulate the size, density and consistency of the food emulsion product. Excess casing material could be entrapped in the braking device, for example, to the extent that the pressure of the food emulsion being stuffed into the casing causes the casing to blow out, thus spewing food emulsion into the work area necessitating costly clean up, stoppage of the equipment and waste of the food emulsion product. Thus, some would consider the ideal casing to be that which uses the least amount of casing material as possible, in the formation of the end-closure.

Many different types and forms of end-closures have been tried in respect to the casings for food emulsion products. Examples for such end-closures are found in U.S. Pat. Nos. 3,162,833; 3,274,005; 3,865,954; 3,882,252; 3,892,869; 3,942,568; 3,942,569; 4,075,398; 4,411,048; 4,428,402; 4,525,984; 4,693,280 and 4,792,047. One type of end-closure shown, for example, in U.S. Pat. No. 3,162,893 simply twists the end of a de-shirred portion of the casing. Another example of this type of end-closure is shown in U.S. Pat. No. 4,792,047.

Another type of end-closure is simply made, principally, from inverting an end of the casing material and reinserting that inverted end back into the shirred portion of the casing stick, where it is compacted by one mechanism or another. U.S. Pat. No. 3,892,869 shows, perhaps, the simplest form of this where a straight linear compaction of the inverted casing portion is shown. U.S. Pat. No. 3,942,569 shows an end-closure which is formed by pulling out a section of shirred casing material, turning it sideways such that its axis is transverse to the longitudinal axis of the shirred casing material, and then pushing that turned portion, folding it back upon itself inside of the bore of the shirred casing stick. U.S. Pat. No. 4,075,938 shows an end-closure where casing material is de-shirred from the stick inverted and pushed back inside of the bore of the stick where it is more or less re-shirred.

Other types of end-closures are shown which don't clearly fit either of the above two categories. U.S. Pat. No. 3,274,005 shows a system wherein a hook is inserted axially through the full length of the bore of the shirred stick. The hook is then canted away from the line of the axis to catch an edge of the fore-end of the shirred casing stick. The hook is then centered along the stick axis with the caught end engaged by the tip of the hook. The hook is then twisted, wrapping the casing around its shank, and the hook, with the casing wrapped around it, is pulled axially back internally into the bore of the casing stick. The hook is then manipulated to free it from the entangled, wrapped portion of casing. Another embodiment of this invention shows a square ended shaft being utilized in place of the hook. It is necessary for the operator to engage a de-shirred portion of the shirred casing stick with this square end, while the square end is rotated, to form a twist. The twist is then pulled by the shaft back into the bore of the shirred casing stick where the square end shaft is disengaged.

U.S. Pat. No. 3,865,954 shows an end-closure which has a portion of the lead end of the casing stick de-shirred from it and inverted back into the bore of the stick. The inverted section of casing is then twisted to make a closure. U.S. Pat. No. 3,882,252 shows an end-closure which is formed by a pair of pinchers pinching the lead end of a shirred casing stick, de-shirring it, clamping the ends flatly together and either inserting glue to hold those ends closed or placing some form of tape around the compressed ends to hold them together, thus forming a closure. U.S. Pat. No. 4,411,048 shows an end-closure formed by a fluted tool which is first canted to engage the lead end of a shirred casing stick, then twisted to wrap the casing around that fluted end as the axis of the tool is brought back into alignment with the axis of the shirred casing stick. The tool with the casing twisted around it is then inserted into the bore of the lead end of the shirred casing stick where it is disengaged by opposite rotation of the fluted tool from the twisted end, and the tool is then withdrawn. An anvil is then brought into place, where the fluted tool had been, to act as a backstop while a compressor means is inserted from the opposite end of the shirred casing stick, through the full bore thereof, to compress the twist together. U.S. Pat. No. 4,428,402 shows an end-closure which is formed from de-shirring a substantial amount of casing from the shirred stick, twisting it into a closure about the mid-point of the de-shirred portion and then sleeving the portion, extending from the twist to the fore-end of the casing, back over the twist while inserting the now double-walled portion, back inside of the bore of the shirred casing stick. In one embodiment a gas escape aperture is provided in this end-closure.

U.S. Pat. No. 4,693,280 shows an end-closure which is formed in a manner generally the same as that shown in U.S. Pat. No. 3,865,954 wherein a section of the fore-end of a shirred casing stick is de-shirred and pushed back inside of the bore of the shirred casing stick, being partially inverted. This partially inverted section is then compressed in a manner similar to the compression described above in regard to U.S. Pat. No. 4,411,048.

Many of the end-closures described above which are used to close off the end of casings suffer from various concerns which make them less than ideal. For example, many of the foregoing prior art end-closures use substantial quantities of shirred casing. Primary examples of this are U.S. Pat. Nos. 3,942,568; 3,942,569 and 4,693,280. Some of the above referenced end closures require the extension of tools through the full length of the casing stick, from the opposite end of that stick, thus increasing the potential for damage to the casing in the formation of the end closure. Examples of this are U.S. Pat. No. 3,274,005 and 4,411,048.

It is deemed quite important in the manufacture of food emulsion products to eliminate as much as possible all potential for inclusion of foreign materials or articles in the food emulsion. Thus, particularly in the use of automated packaging equipment for linked material, there is a great degree of apprehension in regard to using any type of end-closure which would introduce such foreign material or articles. U.S. Pat. No. 3,882,252 creates an end-closure which has such type of foreign material or articles introduced and therefore suffers from this deficiency. In the food emulsion packing industry, there is great concern for any type of end-closure which forms a double wall on the casing which could potentially be subject to entrapment in the sizing or braking device used if pushed out of the shirred casing stick by the initial impact of the extruding food emulsion on the end-closure. Examples of the prior art which encounter this as a problem include U.S. Pat. No. 4,428,402 and 4,693,280.

Thus, there is a need for an end-closure design, and a method for forming that end-closure, which avoids the usage of all but a very small portion of the fore-end of the casing stick and which can be readily unwrapped in the event that the initial portion of the food emulsion is not up to standard and, thus, must be stripped for recycling, but also an end-closure which is sufficiently strong and permanent enough that it can be utilized when the initial portion of the food emulsion stuffed into the casing meets the requirements of the specification for use. Also to be included should be a means for egress of otherwise entrapped gases, such as, for example, air in the casing. Also included should be means to cushion the initial shock of the food emulsion as it impacts the casing closure to overcome static inertia and friction to get the casing moving and to avoid the end-closure being pushed out by the initial impact of the extruding food emulsion on that end-closure. And finally, what is necessary is a means of formation of such an end-closure which does not require an insertion of any tooling through the full length of the bore of the shirred casing stick, confining the manipulation of the casing material and the contact with the tooling to only the foremost end of the casing. Such an end-closure, of course, needs to be free of foreign materials or articles and should be adaptable to various casing sizes.

SUMMARY OF THE INVENTION

In one aspect, the present invention comprises an end-closure for a shirred casing stick. The end-closure comprises a twisted knot and a wad of de-shirred food casing material, both of which are formed from food casing material de-shirred from the shirred casing stick. Both the twisted knot and the wad are interference fitted within the bore of the shirred casing stick, being positioned adjacent to the end of the shirred casing stick. A portion of the de-shirred casing material is inverted back over the twist knot, surrounding it to lock it in place to inhibit the natural resiliency of the casing material from untwisting the twisted knot. Another portion of the de-shirred casing material is non-inverted, being an extension of the casing material from the shirred casing stick to the twist knot, while the inverted portion is an extension of casing material from the end thereof to the twist knot. Both the inverted section and the non-inverted section, with the twist knot therebetween, are compressed by applied force such that the inverted and non-inverted sections are intermixed by being bunched up together to form the wadded casing material, the wad, which is interference fitted within the bore of the shirred casing stick. The interference fit tends to maintain the wad intact, as well as providing a shock absorber for the initial impact of food emulsion being extruded into the casing, as will be explained hereinafter. There is a gas relief aperture extending through the twist knot and, in a tortuous path, through the wad to permit the escape of gases from within the casing as it is being stuffed with food emulsion.

Another aspect of the present invention comprises an end-closure for food emulsion casing which may be, for example, formed from the leading end (foremost end) of a shirred stick of such casing. The closure comprises a twisted knot formed from the de-shirred fore-folds of the leading end of a shirred stick of food emulsion casing. The twisted knot includes means for gas escape, e.g., an aperture through the twisted knot. The knot is formed such that the former fore-folds of that leading end, which were de-shirred and formed into the end-closure, are positioned to be in compression contact with the food emulsion stuffed into the casing, the twisted knot and adjacent abbreviated sections of casing material being wadded and stuffed back into the bore of the end of the shirred casing stick to which it is attached in an interference fit to diminish the potential for the end-closure being pushed out of the shirred casing stick by the initial impact of the extruding food emulsion on that end-closure.

Extending from the twisted knot are two short sections of wadded casing which are not part of the main body of the shirred casing stick, and which, together with the twisted knot, are bunched up together and intermixed into a wad which might be analogized to the shape and disposition of material which might be formed if a person crumpled up the casing material in their hand. After the wad is stuffed back into the end of the shirred casing stick, the wad extends axially for an abbreviated distance within the bore of the shirred casing stick, in an interference fit, and functions as a shock absorber for the initial impact of the moving food emulsion as it is brought into initial contact with the end-closure of the shirred casing stick. The term "interference fit" as used herein means that some degree of force is necessary to extract that which is interference fitted from that into which the interference fitting is effected, due to frictional contact therebetween. The twisted knot is connected to both abbreviated sections of wadded casing by the continuation of the casing itself. The abbreviated sections of wadded casing, the wadding or wad, are of course, initially very close in size to the internal bore of the shirred casing stick itself, and the wad is fitted inside of that bore with a modest degree of interference fit. Then, the wadding is preferably compressed to increase that diameter in a manner which increases the degree of interference fit, i.e., increasing the frictional contact creates an enhanced interference fit. Herein reference is made to "stuffed" or "stuffing" in regard to such abbreviated wadded casing portion being placed within the shirred casing stick and interference fitted therein. In the final "interference fit" effected in relation to the present invention, there is substantial contact between the wadding and the bore of the shirred casing stick, such that some mechanical pressure is required, beyond that which is required to de-shirr the shirred casing stick, to push the wadding out of the bore of the shirred casing stick. The wadding is, in turn, connected by one abbreviated section of casing to the main shirred casing stick, this connected section of casing being merely another continuation of the casing material. In fact, the shirred casing stick, the wadding, including both abbreviated sections of casing material and the twisted knot therebetween, are all a continuation of the same casing material and casing.

On impact, the wadding, in addition to acting as a shock absorber, also serves to encase the initial portion of the extruded food emulsion, requiring somewhat more mechanical pressure to both push the wadding out of the bore of the shirred casing stick, and to extend the wadding, than is required to de-shirr the main body of the shirred casing stick. In other words, modest additional mechanical pressure is required as the food emulsion not only must de-shirr the wadding, but must also push it out of the bore of the shirred casing stick into which the wadding had been stuffed in forming the end-closure of the present invention. Thus, the initial portion of the food emulsion material tends to compress to a greater degree, initially against, and then into, the wadding. Since the initial food emulsion portion, on extrusion, tends to be under less pressure and compression, i.e., it is less consistent than the balance of the food emulsion following it, it can be compressed up to a consistent standard, equivalent to the balance of the following extruding food emulsion, by this modest but significant additional required pressure. Thus, the need to recycle the initial portion of food emulsion material can be relatively curtailed and, in some situations, eliminated.

The twisted knot, on the one hand, with its gas release aperture included therein, is sufficiently strong to act as a permanent closure and is capable of withstanding normal pressure and force exerted on the end-closure by the flow of food emulsion material as well as by subsequent handling of the product. The food emulsion stuffed into the casing applies pressure against the twisted knot and helps to hold it in place and form, thus enhancing its ability to act as a permanent end-closure. In addition, a back-fold or inverted abbreviated section of casing material is telescoped back over the twisted knot, serving to "lock" it in place, i.e. to hold it in place and from untwisting. On the other hand, the twisted knot may readily be undone, simply by stripping the back-fold or inverted section of casing material, i.e. the lock, from the twisted knot and untwisting the knot. The gas release aperture is not sufficiently large to allow the escape of food emulsion.

Preferably, the twisted knot and the lock are formed by twisting the casing material about stationary corkscrew means, although a variety of other tooling configurations might be used. Also included are engagement means by which the fore-folds, about the first 3 to 5 folds of the shirred casing stick, are initially caused to come into contact with and partially wrap about the corkscrew means as it is initially maintained in a stationary position. The corkscrew means are then caused to retract, dragging the casing material, twisted about the corkscrew means, with it. Then, the corkscrew means are caused to twist, in corkscrew fashion, by a cam and follower means, to unthread the corkscrew means from the twisted knot, leaving the gas release aperture in the knot. Means are included for back-folding and telescoping that portion of the fore-folds, which remains untwisted, inverting it over the twisted knot to lock it in place and prevent it from untwisting. Also included are means for drawing casing material from a shirred casing stick and reforming, it as well as the back-folded casing material of the lock means, into a wadding to form a wadded section of casing. The combination of the wadding and the twist knot is sized to first readily slip-fit within the bore of the shirred casing stick, with some lesser amount of frictional contact with that bore, by stuffing; then it is preferably further stuffed, by compression, sizing it to create an increased degree of interference fit. Means for stuffing are also included. Also included are means for forming an aperture for the relief or escape of entrapped air or other gas in the twisted knot section of the casing enclosure. All of the foregoing, in addition, have associated drive means and means to otherwise move them as required, respectively, by their functions.

DETAILED DESCRIPTION OF THE PREFERRED EMBODIMENT

Figure 1:
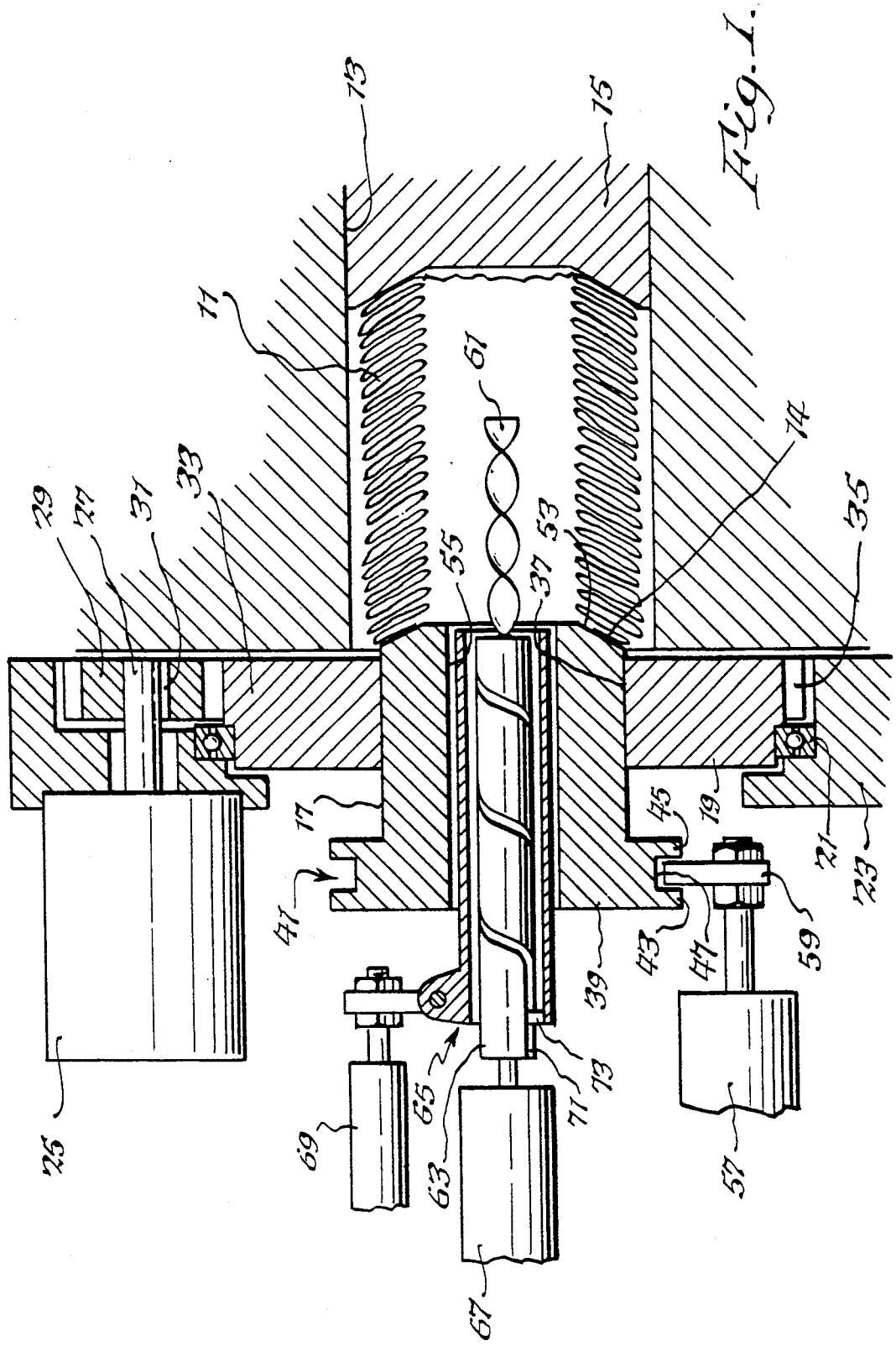
FIG. 1 is a cut-away semi-schematic elevational view of the system for forming the end-closure of the present invention, in its initial position, in contact with a shirred casing stick, but before formation of the end-closure is commenced.

Referring to FIG. 1, there is shown a shirred casing stick 11 which is held in place as shown by holding means, for example, the combination of a hollow cylinder 13 along with a location piston 15 inserted in that hollow cylinder 13. The function of the holding means is to hold the shirred casing stick 11 in place laterally and to maintain it in position, in relation to the means for forming the end-closure, as the end-closure is being formed in that casing. For example, the location piston could be lightly spring loaded to apply a modest axial pressure to the tail end of shirred casing stick 11. Also shown in FIG. 1 is square pick-up 17 which is likewise shown in projection view in FIG. 11. Slidably engaged to square pick-up 17 is square drive gear 19 which, likewise, is shown also in projection view in FIG. 11. Square drive gear 19 is mounted on bearing 21 which in turn is fixably mounted to housing 23. Also mounted to housing 23 is drive motor 25, the drive shaft 27 of which has attached thereto pinion gear 29. Pinion gear 29 is engaged with square drive gear 19, both of which are, preferably, spur gears, such that rotation of the drive shaft 27 by drive motor 25 will rotate pinion gear 29 which will, in turn, rotate square drive gear 19 in the direction of rotation which is opposite to that of pinion gear 29. Square drive gear 19 rotates, as mentioned previously, in bearing 21 which may be, for example, either a ball bearing, a tapered roller bearing, a flanged sleeve bearing, etc. as are well known to those with skill in the art. Pinion gear 29 is fixed to drive shaft 27 by square key 31 also as is well known to those with skill in the art. It will be understood by those with skill in the art that other drive systems, such as, for example, a belt drive system or a chain drive system could be applied as drive means.

The fit of square pick-up 17 to square drive gear 19, as mentioned previously, is slidable in that square pick-up 17, in respect to square drive gear 19, may move axially, freely and without restraint from any sort of fit restriction between square pick-up 17 and square drive gear 19. On the other hand, rotation of square drive gear !9 will always cause rotation of square pick-up 17 regardless of the degree of axial displacement of square pick-up 17 within square drive gear 19. It will be understood by those with skill in the art that, for example, a slidable spline arrangement could also be used to effect the same result.

Figure 11:
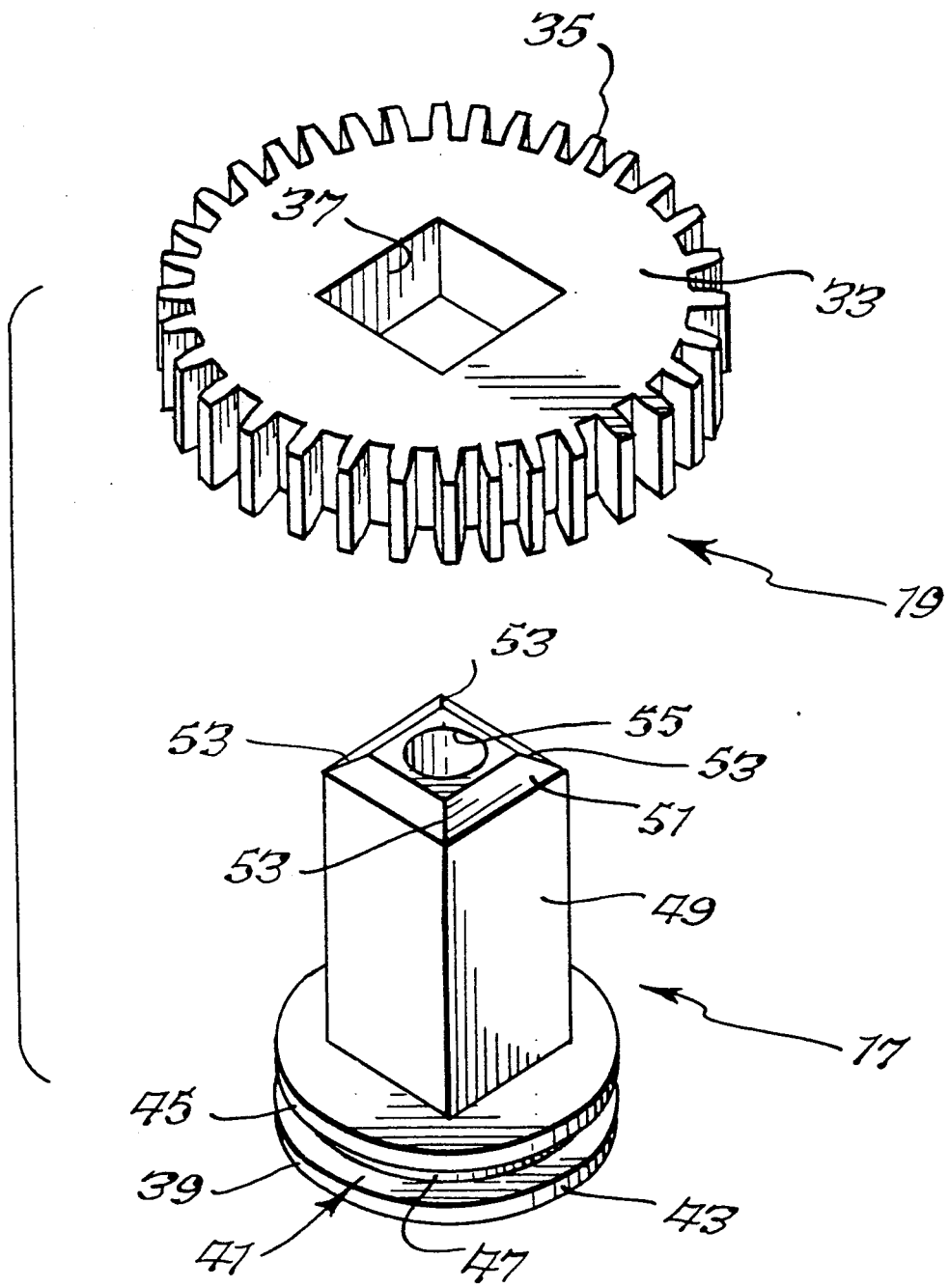
FIG. 11 shows an exploded projection view of the means for causing the fore-folds of the shirred casing stick to be twisted, more or less as a unit, to form the twist-knot about the stationary corkscrew means.

Referring to FIG. 11, it will be noted that square drive gear 19 comprises a hub 33 with, preferably, spur gear teeth 35 mounted thereto and a square bore 37 centrally positioned through the axis of rotation of square drive gear 19. Square pick-up 17 comprises flange 39 which extends radially from the central axis of square pick-up 17. Flange 39, however, is located at one end of square pick-up 17 as distinguished from some other or central location. Centrally positioned and recessed into the radial face of flange 39 is recess 41. Flange 39 also includes outer lip 43 and inner lip 45 which, respectively, form the walls of recess 41, with the smallest circumferential diameter of recess 41 being formed by root 47. Extending axially from flange 39 is square shaft 49; at that end of square shaft 49, which is remote from flange 39, there is formed casing pick-up flare 51. Casing pick-up flare 51 is an inward flaring or tapering of each of the faces of square shaft 49 as shown in the drawing figures. The lines formed by the juncture of each of the faces of casing pick-up flare 51 are flare contact points 53.

As mentioned previously, square bore 37 is sufficiently large, in relation to the size of square shaft 49, such that square drive gear 19 may slide axially back and forth along the length of square shaft 49. However, the sizing of square bore 37 is not so large that square drive gear 19 may rotate independent of square pick-up 19 when square shaft 49 is inserted through square bore 37. Also as mentioned previously, a spline arrangement might be employed to effect the same result, with the engagement of an internal and external spline slidably fitted to each other. Extending centrally around the central axis of square pick-up 17, and extending through square pick-up 17, is center aperture 55.

Referring to FIGS. 1-10 it will be noted that square pick-up 17 is actually movable in square bore 37 in relation to square drive gear 19 by linear movement means which may, for example, be a hydraulic cylinder 57 to which is attached lug 59 which in turn rides in recess 41. The linear movement of square pick-up 17 functions to bring flare contact points 53 into contact with the foremost end, the leading end 14 and the fore-folds 12, of shirred casing stick 11. It will be understood by those with skill in the field that the linear movement could be generated by alternative linear movement means such as, for examples, a ball screw mechanism, an eccentric or an air or electric cylinder.

In forming the end-closure of the present invention, the casing material is preferably in the same condition of flexibility as is usually established for forming the shirred casing stick, i.e., for shirring the casing. Typically, the casing material is wet, for example, containing about 16% moisture. Thus, the casing material is relatively pliable.

Figure 2:
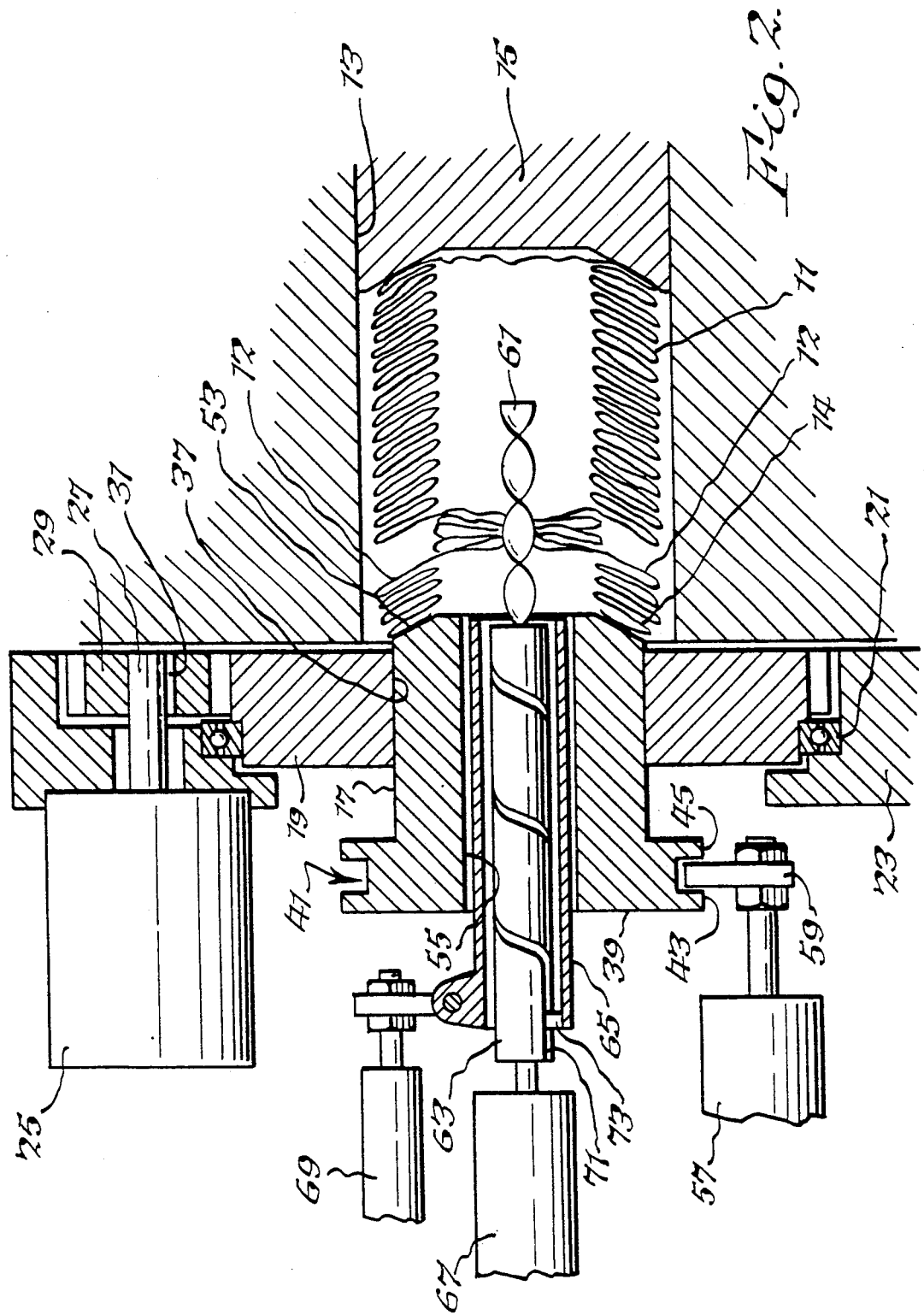
FIG. 2 is a view which is generally the same as that of FIG. 1 showing the initial step of operation of the system causing a plurality of folds adjacent the lead end of the shirred casing stick to de-shirr and twist, tightening to engage the stationary corkscrew means.

The engagement of flare contact points 53 with the foremost edge of shirred casing stick 11 is not done under any significant pressure. Location piston 15 and hydraulic cylinder 57 are positioning and locational devices rather than devices primarily to put any great degree of compressive force, in an axial direction, on shirred casing stick 11. Rather, all that is necessary is, initially, preferably a few ounces of pressure to maintain light contact of the fore-folds 12 of shirred casing stick 11 with flare contact points 53. When such contact is made, drive motor 25 is energized which causes pinion gear 29, attached to drive shaft 27, to rotate. This, in turn, causes square drive gear 19 to rotate in the opposite direction. The rotation of square drive gear 19 also rotates square pick-up 17 which causes flare contact points 53, engaged with the leading end 14 of shirred casing stick 11, causing the fore-folds 12 to turn. The turning of the fore-folds 12 causes at least one and typically two or three of the folds of shirred casing material of the fore-folds 12 to simultaneous de-shirr and twist, as shown in FIG. 2. Typically, the de-shirred and twisted folds of the shirred casing material are those which are typically the fourth and/or fifth removed from the leading end 14 of the shirred casing stick 11; although this may vary somewhat depending on the degree of pliability of the casing material and the degree of pressure, applied by the flare contact points 53, on the leading end 14 of the shirred casing stick 11.

The de-shirring and twisting of at least one fold of the fore-folds 12 reduces the internal diameter of the casing material, bringing it into contact with corkscrew means 61 as shown in FIG. 2. Corkscrew means 61, at this point, is stationary. Corkscrew means 61 may be, for example, a fluted section as might be formed by axially twisting a flattened bar several times through a 360° arc, or it may be in the form of a screw conveyor with distinct flights having infinitely variable pitch, or it may be in the traditional form of a corkscrew, being a round rod which is formed to a spiraling shape about a central axis. As shown in FIG. 1, corkscrew means 61 is extended within the bore of shirred casing stick 11.

Corkscrew means 61 extends axially from cam cylinder 63. Cam cylinder 63 is mounted concentrically within center aperture 55 of square pick-up 17. Interposed between cam cylinder 63 and center aperture 55 is cam follower tube 65 which, likewise, is concentrically mounted within center aperture 55 of square pick-up 17. Cam follower tube 65 functions as an inverter means for the casing material in forming the wadding 77 as will be further explained hereinafter. Cam cylinder 63 is longitudinally extendible along its central axis by linear motion means, for example, hydraulic cylinder 67 which is connected to that end of cam cylinder 63 which is opposite the position of corkscrew means 61, as shown in FIGS. 1-10. Thus when hydraulic cylinder 67 is activated, cam cylinder 63 is extended into the bore of shirred casing stick 11.

Because corkscrew means 61 is mounted to and extends from the axis of cam cylinder 63, when cam cylinder 63 is moved to within the bore of shirred casing stick 11, corkscrew means 61 is extended that much further into the bore of shirred casing stick 11. Cam follower tube 65 is also independently extendible, longitudinally, along the concentric of axes center aperture 55 and cam cylinder 63. Cam follower tube 65 may, for example, be extendible by hydraulic cylinder 69. As mentioned previously, it should be understood that hydraulic cylinders 57, 67 and 69, as well as location cylinder 15, are exemplifications of means for creating linear motion and could be replaced, for example, by machine screw arrangements turned by electric motors or a variety of other types of apparatus which functions to create linear motion as will be well understood by those with skill in the art.

It will be noted from viewing FIGS. 1-10 that cam cylinder 63 has a cam groove 71, generally in the form of a keyway. Initially, cam groove 71 extends longitudinally along the surface of cam cylinder 63 for a length generally equivalent to the typical length of the fore-folds 12 of shirred casing stick 11, as shown best in FIG. 2; at this point, the keyway form of cam groove 71 is transformed into a spiral groove, spiraling around the full circumference of cam cylinder 63 at least once and preferably terminating adjacent to the end of cam cylinder 63 where corkscrew means 61 is mounted. It will also be noted from viewing FIGS. 1-10 that cam follower tube 65 has mounted thereto cam key 73 which is sized to fit both the linear and spiral extensions of cam groove 71. As will be noted from carefully studying FIGS. 1-10, as cam key 73 is moved along the extension of cam groove 71, initially for the length of its longitudinal extension in cam cylinder 63, cam key 73 serves to maintain cam cylinder 63 in a static position relative to rotation about its axis. However, as the progression of the movement of cam key 73 transforms into a spiral movement, as it enters the spiral portion of cam groove 71, the linear extension of cam follower tube 65 causes cam key 73 to rotate cam cylinder 63 in accordance with the pitch of the spiral of cam groove 71.

The pitch of the spiral of cam groove 71 is an approximate match for the pitch of corkscrew means 61 such that the linear motion of cam cylinder 63, through one 360° rotation of cam cylinder 63, will be equal to the length of one full 360° flute of corkscrew means 61. Thus, the linear movement generated by one complete spiraled revolution of cam cylinder 63 would be equal in linear movement of one full revolution of corkscrew means 61 in respect to something through which corkscrew means was being threaded. To state this another way, one full 360° rotation of corkscrew means 61 will cause corkscrew means 61 to linearly move, through some object into which corkscrew means 61 is threaded, a certain distance generally equal to the length of, for example, a full 360° rotation of a flute of corkscrew means 61; the spiral of cam groove 71 is adapted to move cam cylinder 63 generally approximately the same amount of linear distance that corkscrew means 61 is to be moved.

Cam cylinder 63 and cam follower tube 65 may be moved in unison, each with the other, by uniform movement of both hydraulic cylinders 67 and 69, thus both cam cylinder 63 and cam follower tube 65 may be extended into the bore of shirred casing stick 11 without rotation of either corkscrew means 61 or cam cylinder 63. The rotation of cam cylinder 63 is caused by the movement of cam cylinder 63 in respect to cam follower tube 65, thus cam follower tube 65 could be maintained in a stationary position while cam cylinder 63 is longitudinally moved in relation thereto by hydraulic cylinder 67. Alternatively cam cylinder 63 could be maintained in a stationary position while cam follower tube 65 is linearly moved in relation to cam cylinder 63 by hydraulic cylinder 69, or both could be moving in opposite directions; that is to say that cam cylinder 63 could be moving to extend further into the bore of shirred casing stick 11 while, concurrently, cam follower tube 65 is linearly moving in the opposite direction.

Referring to FIG. 2, it will be seen that the fore-folds 12 have been spaced apart from the balance of the folds of casing material of the shirred casing stick 11; this was accomplished by rotating square pick-up 17 with flare contact points 53 engaging the leading end 14 of shirred casing stick 11 as was explained previously. The fore-folds 12 are, thus, caused to turn by the rotational engagement of flare contact points 53 with the leading end 14 of shirred casing stick 11. This, in turn, causes at least one and typically a few folds of the shirred casing stick 11 to simultaneously de-shirr and twist, reducing the internal diameter towards the position of corkscrew means 61 and into contact therewith. There has been, so far, no motion of and no change of position of either cam cylinder 63 or cam follower tube 65 from FIG. 1 to FIG. 2, thus corkscrew means 61 has remained stationary from FIG. 1 to FIG. 2.

Figure 3:
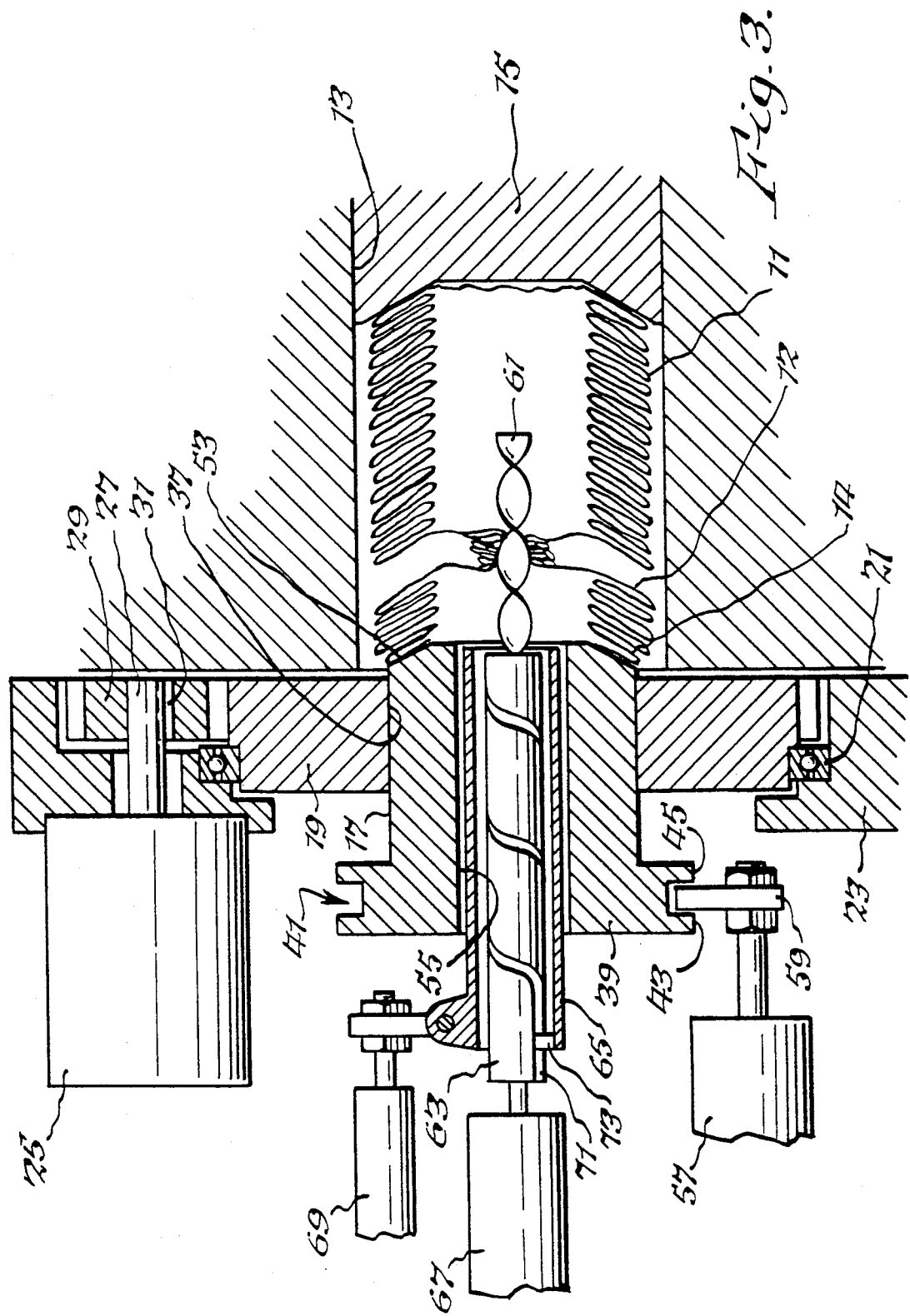
FIG. 3 is the same general view as FIGS. 1 and 2 but showing the tightened twist, forming the twist-knot, about the stationary corkscrew means with the fore-folds of the shirred casing stick still predominantly holding their initial form.
Figure 4:
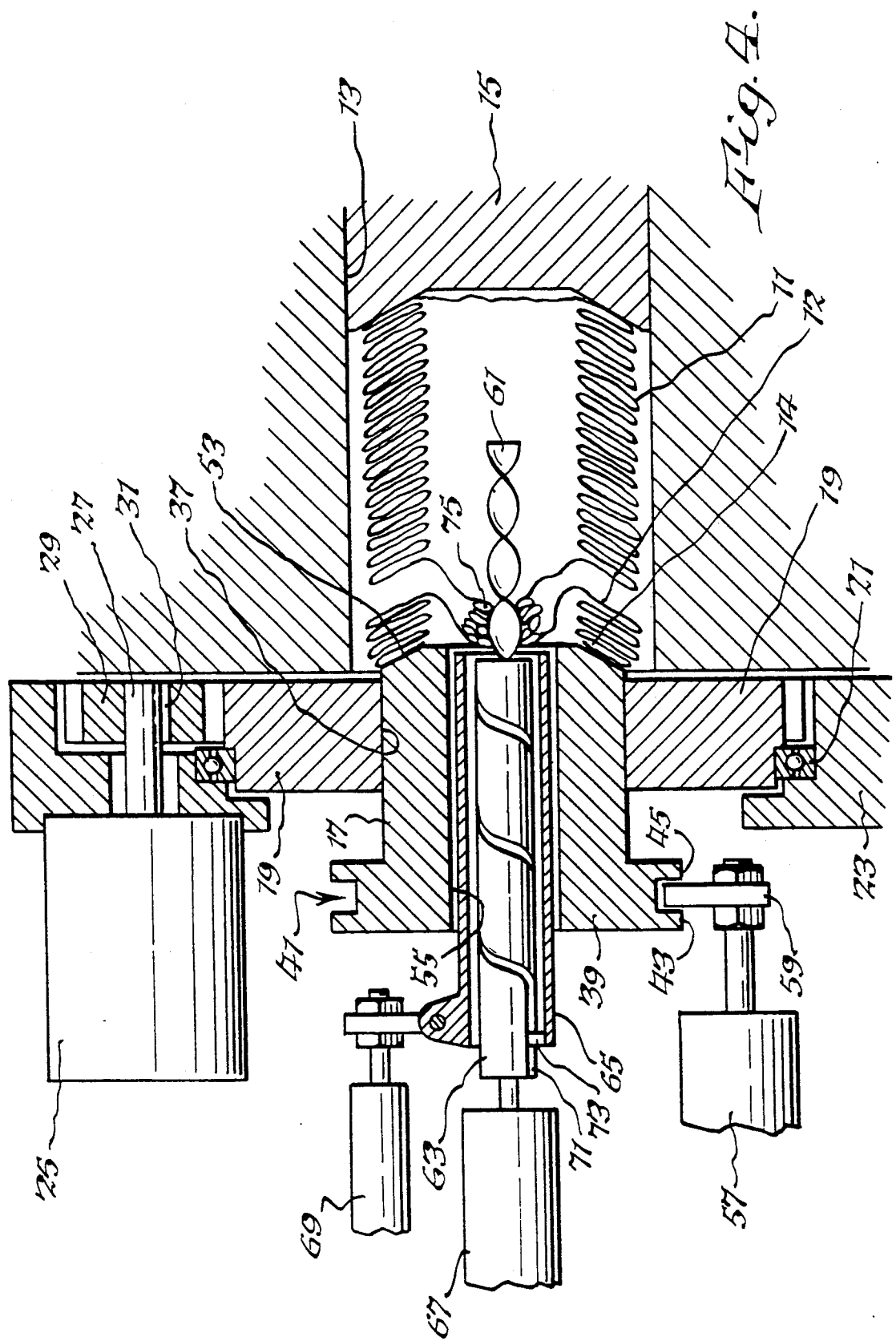
FIG. 4 is the same general view as the previous figures showing the tightened twist, forming the twist-knot, about the corkscrew means, but also showing the corkscrew means being axially withdrawn from the bore of the shirred casing stick, drawing the twist-knot and, thus, the adjacent material, with it, unfolding the fore-folds axially away from the shirred casing stick.

Referring to FIG. 3, further rotation of square pick-up 17, with flare contact points 53 rotating fore-fold 12, has caused the casing material of the de-shirred and twisted casing material to twist about stationarily positioned corkscrew means 61. As this rotation continues, the de-shirred casing material becomes twisted progressively more tightly around corkscrew means 61 to the point where it begins to thread linearly along corkscrew means 61 towards cam cylinder 63, completing the formation of twist knot 75 as shown in FIG. 4. As will be understood by those with skill in the art, the formation of twist knot 75 really commenced with the initial engagement of the casing material with corkscrew means 61. Still, at this point as shown in FIG. 4, there has been no change in position of either cam cylinder 63 or cam follower tube 65. As will be noted in FIG. 4, additional casing material has begun to de-shirr from both the fore-folds 12 and the shirred casing stick 11, caused by the treading of the casing material along corkscrew means 61, completing the formation of twist knot 75. At this point, the rotation of square pick-up 17 can be and normally is halted.

Figure 5:
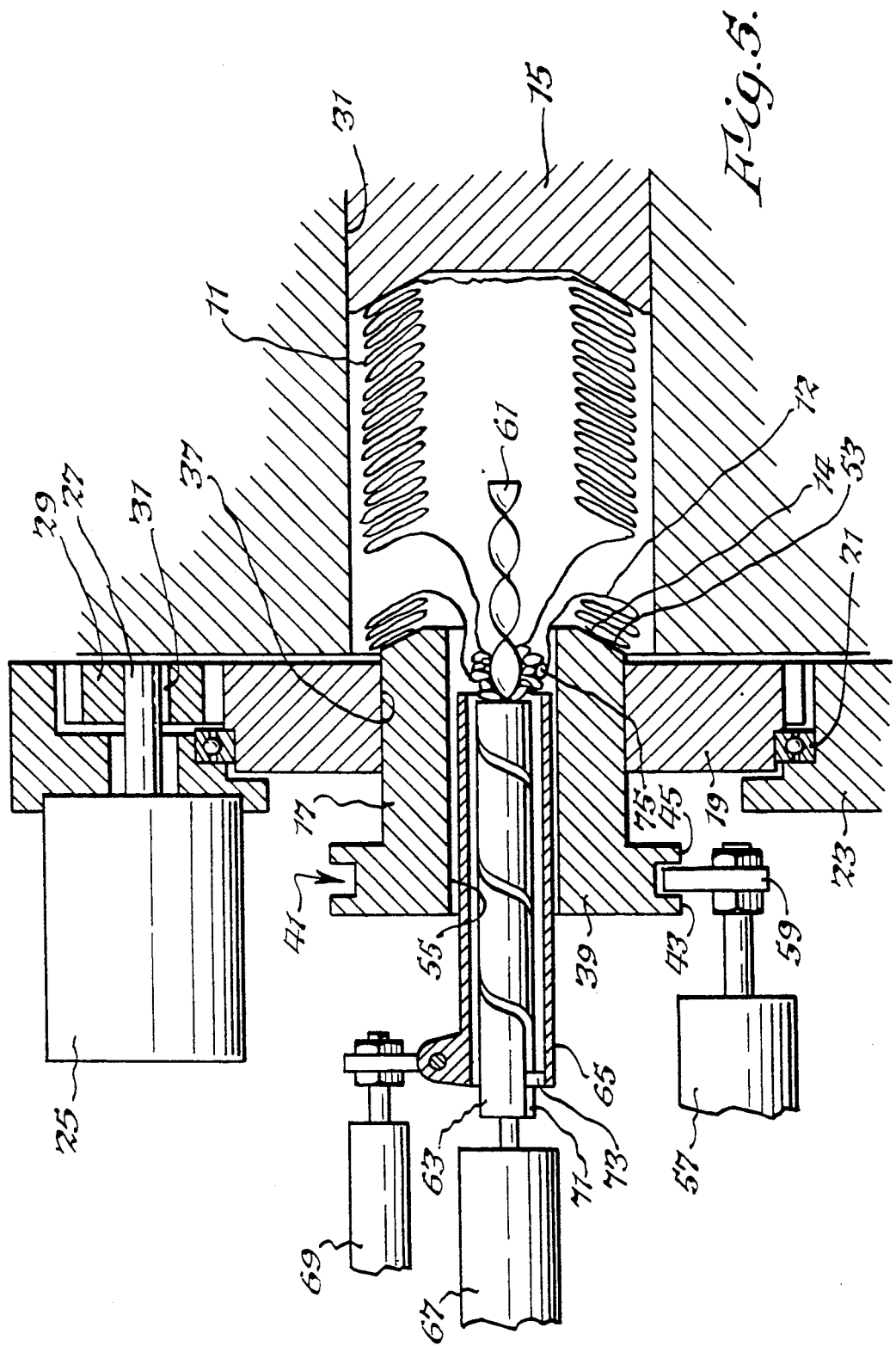
FIG. 5 shows a further withdrawal of the twist-knot and the fore-folds being unfolded, with the lead end of the casing material being drawn away from the shirred casing stick.

Referring to FIG. 5, it will be seen that both cam cylinder 63 and cam follower tube 65 are in the process of linearly moving away from the bore of shirred casing stick 11, thus causing a withdrawal of corkscrew means 61 from within that bore. This withdrawal does not normally begin until the rotation of square pick-up 17 has been stopped. The casing material, now twisted around corkscrew means 61 to form twist knot 75, is pulled along with the movement of cam cylinder 63 and cam follower tube 65, thus de-shirring an additional portion of shirred casing stick 11 as well as the balance of the fore-folds 12, as shown in FIG. 6.

FIG. 5 shows the progress of cam cylinder 63 and cam follower tube 65 away from the position of the bore of shirred casing stick 11 as well as concurrent progress of corkscrew means 61 pulling twist knot 75 and the twisted portions of the casing material of both the fore-folds 12, and the shirred casing stick 11, with it. FIG. 6 shows cam cylinder 63 and cam follower tube 65 at the furthest position away from shirred casing stick 11, with the fullest extension of de-shirred casing necessary to make the end-closure of the present invention. As will be noted from FIG. 6, the casing material which had comprised the fore-folds 12 is now completely de-shirred to be back-folded, telescoping over the de-shirred casing material from shirred casing stick 11; thus the twist knot 75 is encased, within the casing material which had comprised fore-folds 12, to form lock means 79 which telescopes over both twist knot 75 and a portion of the de-shirred casing material from shirred casing stick 11, preventing twist knot 75 from untwisting. In the position shown in FIG. 6, there has still been no rotation of cam cylinder 63 or corkscrew means 61 up until this point. The only rotation that has occurred has been by square pick-up 17 and, specifically, flare contact points 53 against the leading end 14 shirred casing stick 11 to rotate fore-folds 12.

Figure 7:
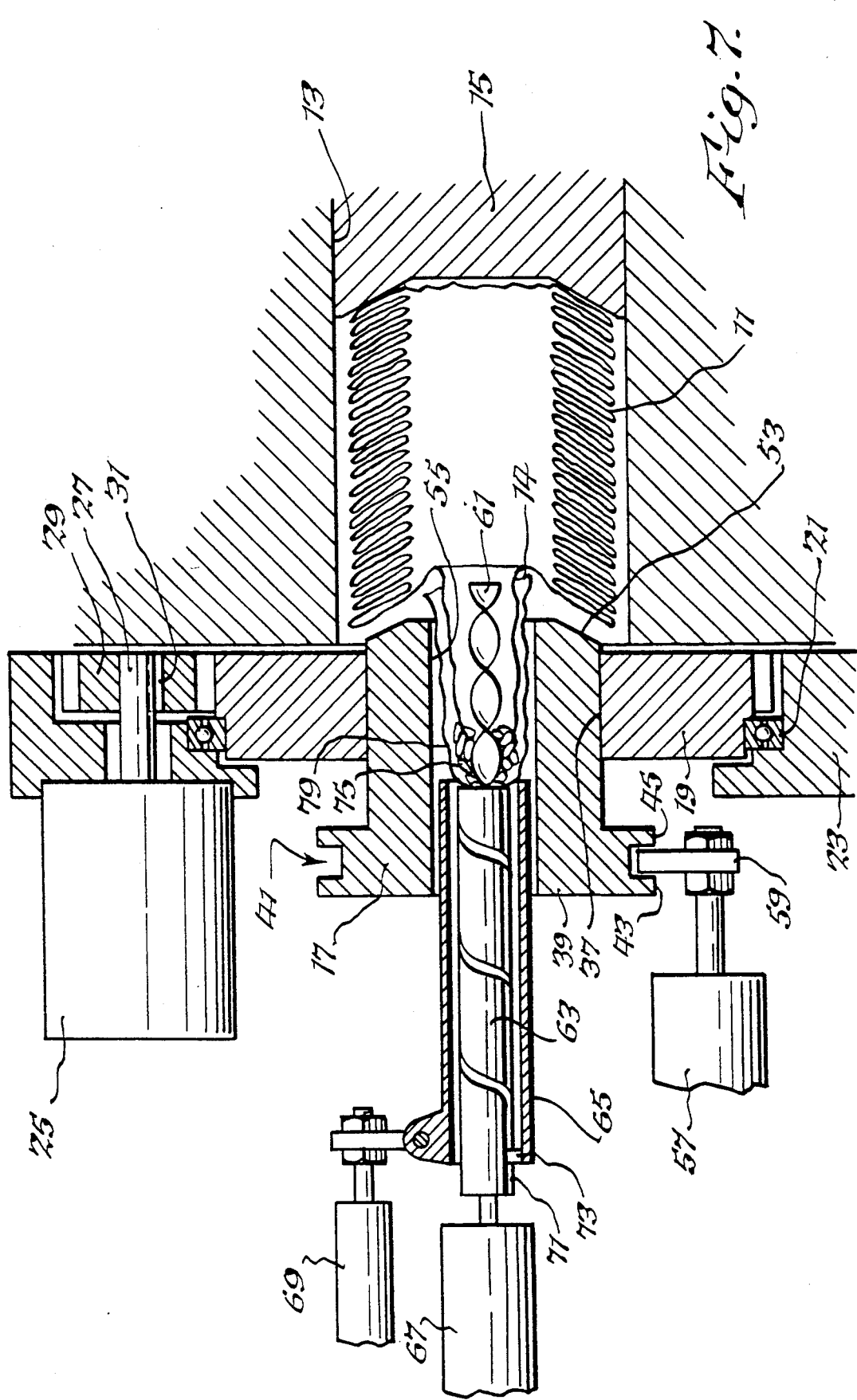
FIG. 7 is the same view as shown in FIG. 6, but with the shirred casing stick having moved into position to take up the space of the withdrawn casing material.

At the point where the rotation of square pick-up 17, and thus the rotation of flare contact points 53, is normally halted, hydraulic cylinder 57 may be activated to withdraw square pick-up 17, to a small degree, away from contact with shirred casing stick 11. During the foregoing steps in the formation of twist knot 75 and lock means 79, location piston 15 has caused shirred casing stick 11 to progressively advance in hollow cylinder 13, urging shirred casing stick towards the position of square pick-up 17, as shown in FIG. 7. Activation of hydraulic cylinder 57 releases remaining pressure imposed by square pick-up 17 on shirred casing stick 11.

Figure 6:
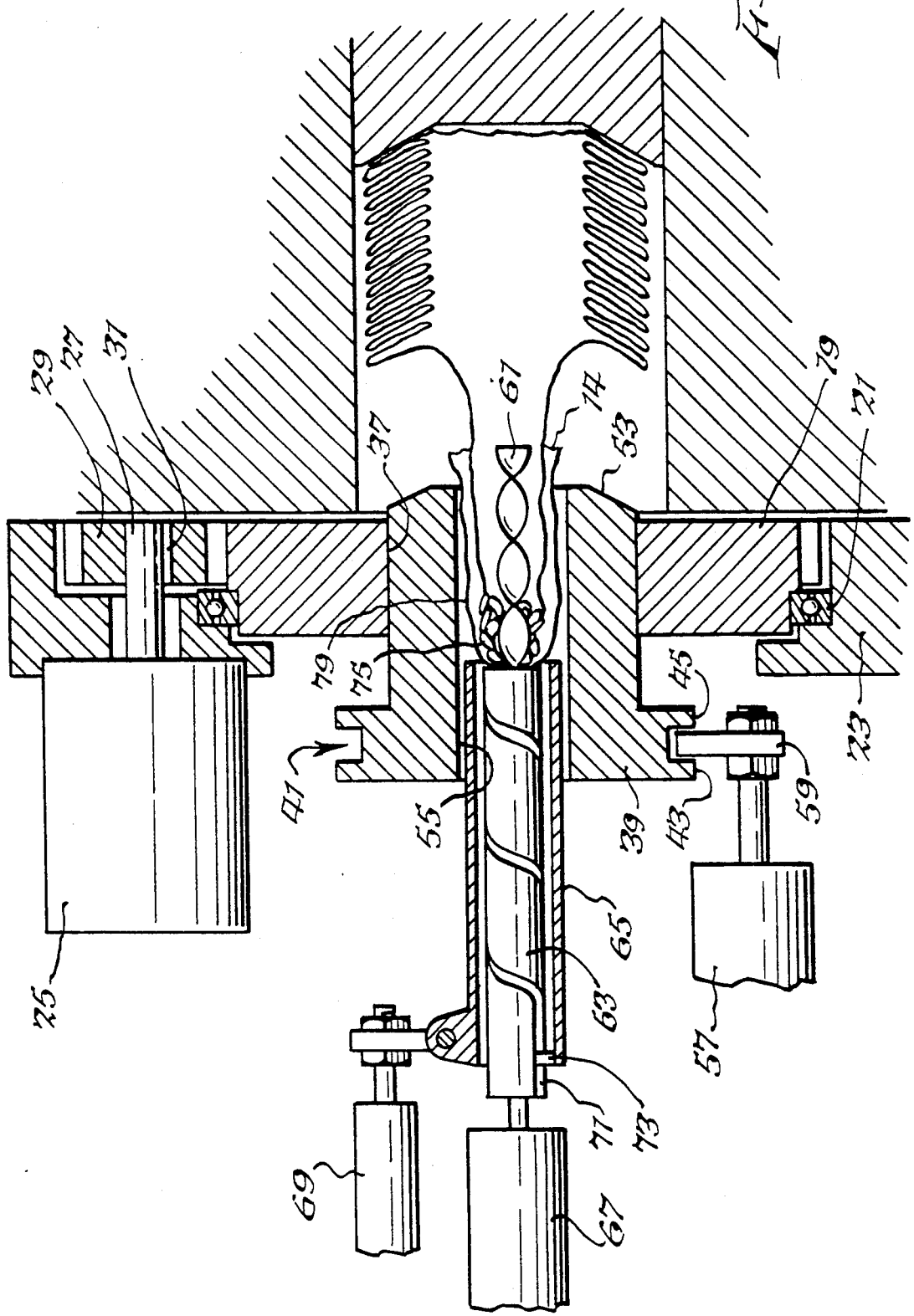
FIG. 6 shows the full withdrawal of the twist-knot from the shirred casing stick with the now unfolded fore-fold material inverted back over the twist-knot to form a lock.
Figure 8:
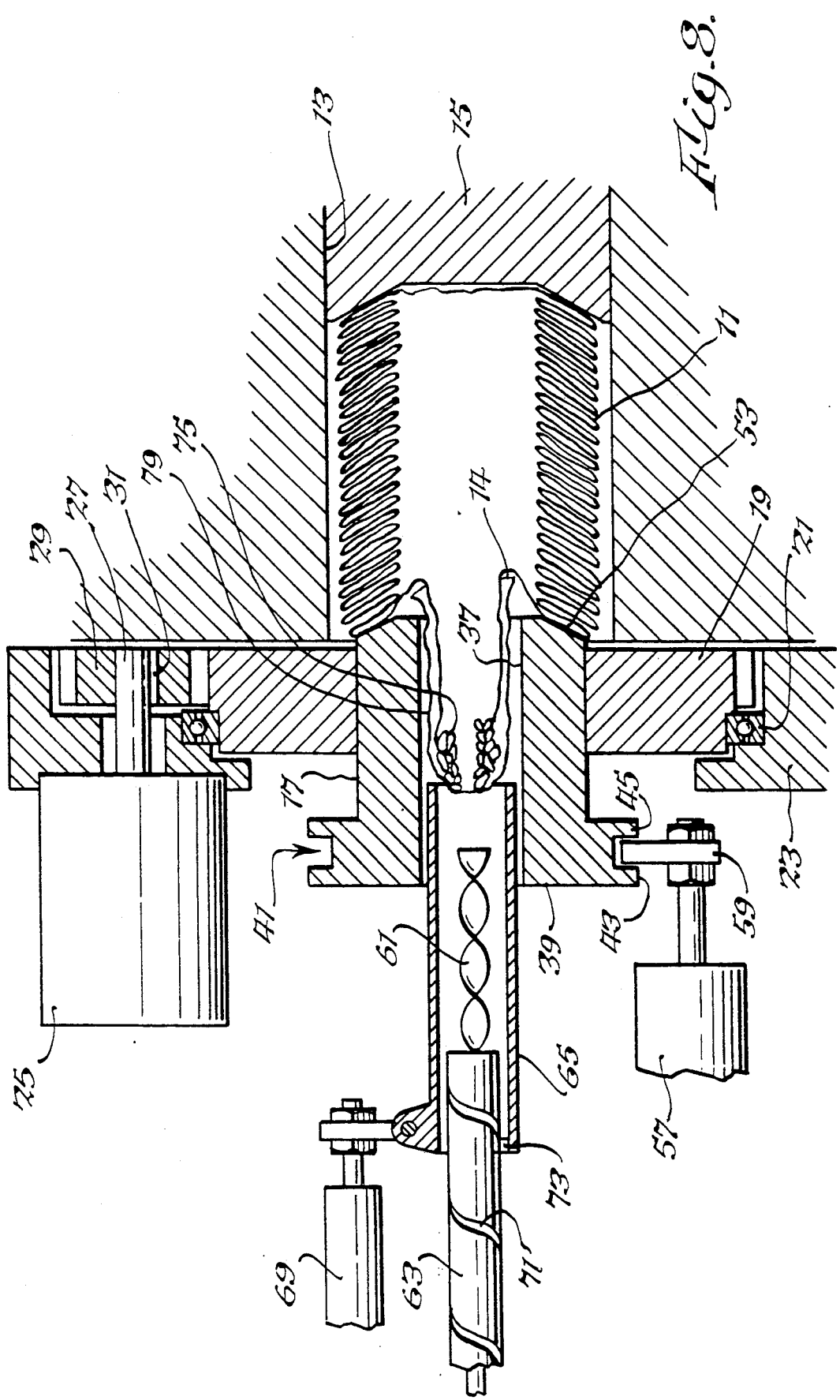
FIG. 8 shows the progression of movement of the cam means, in relation to its follower means, as the cam cylinder is withdrawn from the cam follower tube, disengaging the corkscrew means from the twist knot.

Referring to FIG. 8, it will be noted that the linear position of cam follower tube 65 has not changed in comparison to that shown in FIGS. 6 and 7, however cam cylinder 63 has been linearly withdrawn to its furthest extreme away from the bore of shirred casing stick 11. This relative linear movement of cam cylinder 63 has caused corkscrew means 61 to unthread from twist knot 75, leaving twist knot 75 and lock means 79 in about the same position shown in FIGS. 6 and 7.

The linear withdrawal of cam cylinder 63, caused by action of hydraulic cylinder 69, has caused cam key 73 to traverse the linear portion of cam groove 71 and then to rotate cam cylinder 63 by virtue of cam key 73 traversing the spiral portion of cam groove 71. This rotation, in turn, has caused rotation of corkscrew means 61 which has effected the unthreading of twist knot 75 from corkscrew means 61. Twist knot 75 has been prevented from unthreading itself by lock means 79. To effect an untwisting of twist knot 75, expansion of the outside diameter of twist knot 75 would be occasioned. The telescoping of the casing material of lock means 79 over twist knot 75 prevents such diametrical expansion and, thus, holds twist knot 75 in its twisted form. If necessary, to hold shirred casing stick 11 in a stationary position while corkscrew means 61 is rotated to unthread from twist knot 75, square pick-up 17 can momentarily be advanced against shirred casing stick 11 by hydraulic cylinder 57, preferably without square pick-up 17 being rotated, to place some momentary linear pressure on shirred casing stick 11, thus preventing it from rotating and, otherwise, causing it to be maintained in a stationary position.

Due to the fact that shirred casing stick 11 comprises casing material which is very thin in wall thickness, the force required to deform such casing past its limit of elasticity, thus creating a somewhat permanent set in that casing material, is very modest. Thus, the rotation of corkscrew means 61, in combination with the formation of lock means 79, is sufficient to substantially set the form of tightened twist knot 75 such that it will not resiliently unravel, to any significant degree to the point of becoming undone, when corkscrew means 61 is unthreaded from twist knot 75 and the mechanical pressure thereon is released. In addition, if a wet casing material has been used, twist knot 75 will be further set as the casing material dries. On the other hand, due to the natural resiliency of casing materials, the release of mechanical pressure somewhat relaxes the tight twist of twist knot 75 enabling a looser unthreading of corkscrew means 61 from twist knot 75 without drag or pulling.

Figure 9:
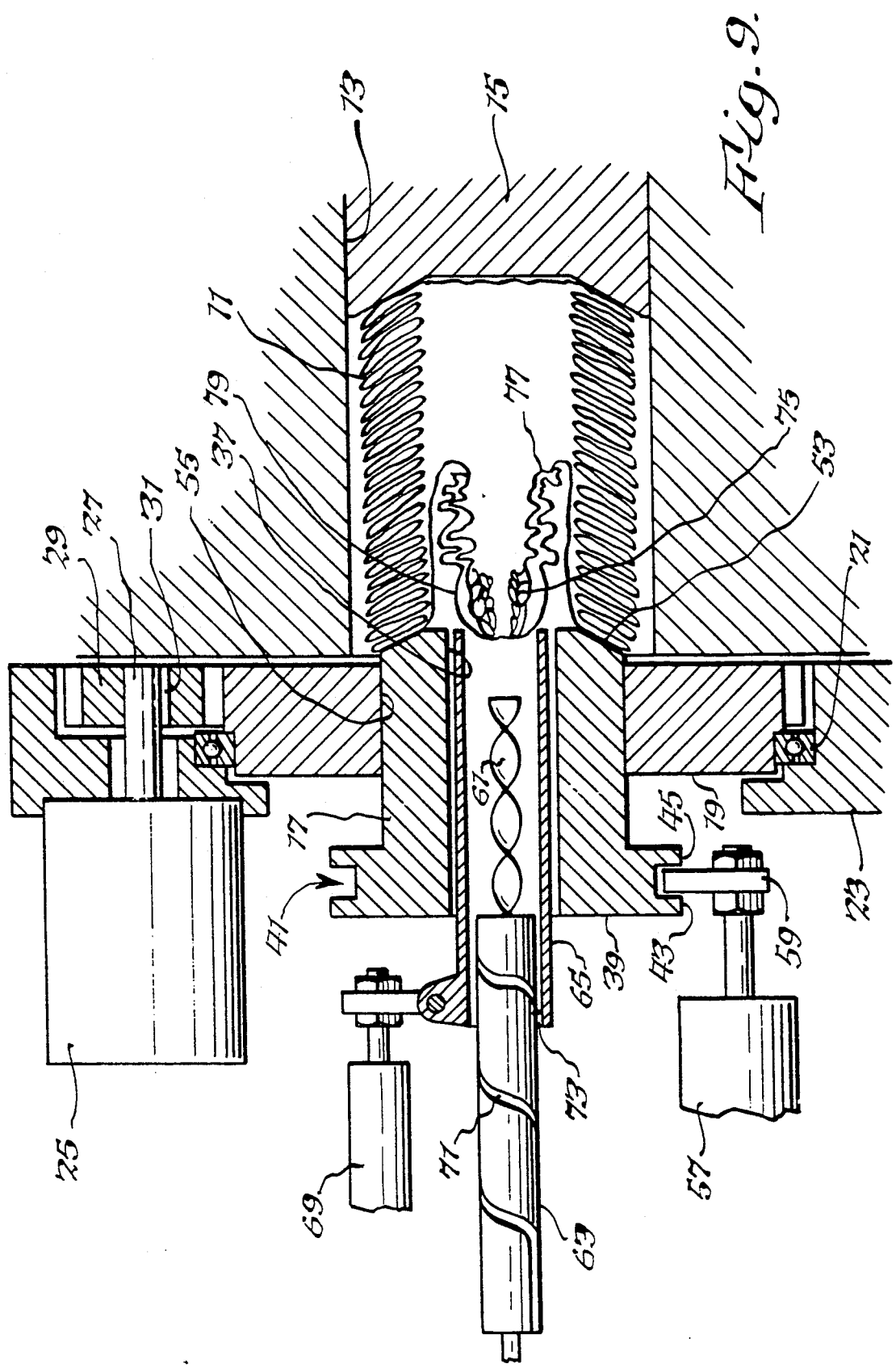
FIG. 9 shows the twist knot and the adjacent casing material being inverted into the bore of the shirred casing stick, forming a wadding of casing material.

Referring to FIG. 9, it will be noted that cam follower tube 65 has been advanced, by hydraulic cylinder 69, to the same position that it was as shown in FIGS. 1 through 4. Cam cylinder 63 has been moved, by hydraulic cylinder 67, along with cam follower tube 65 such that there has been no relative change in the positions of cam follower tube 65 and cam cylinder 63, in respect to each other, from the positioning shown in FIG. 8 to that shown in FIG. 9. On the other hand, from the position shown in FIG. 8, both cam cylinder 63 and cam follower tube 65 have been advanced toward shirred casing stick 11, with corkscrew means 61 within cam follower tube 63, and not extending therebeyond.

The advance of cam follower tube 65, to the position shown in FIG. 9, has pushed twist knot 75 and lock means 79 into the bore of shirred casing stick 11. This has caused the extended casing material connecting shirred casing stick 11 to twist knot 75, to wad up inside the bore of shirred casing stick 11 adjacent to twist knot 75 and lock means 79 as shown in FIG. 9. Further, the excess casing material extending from lock means 79, which had formerly comprised fore-folds 12, has likewise been wadded up in the bore of shirred casing stick 11 by the advance of cam follower tube 65 from the position shown in FIG. 8 to that shown in FIG. 9.

The wadded up quantity of casing material, comprising that which is described in the foregoing paragraph, is herein referred to as wadding 77. At the position shown in FIG. 9, the wadding 77 is relatively loosely packed into the bore of shirred casing stick 11, but with some significant degree of frictional contact, both between adjacent portions of the wadding and with the bore of shirred casing stick 11, providing an interference fit between the wadding 77 and the bore of shirred casing stick 11, although in the schematic representation of the wadding 77, as shown in FIG. 9, this interference fit cannot be clearly illustrated. Optionally, cam follower tube 65 may be extended to a modest degree into the bore of shirred casing stick 11 to further push the wadding 77 into that bore, however, it should be noted that the advance of cam follower tube 65 does not apply any direct force to twist knot 75 or the portion of lock means 79 which is in direct contact with twist knot 75; the reason for this will become apparent hereinafter.

Figure 10:
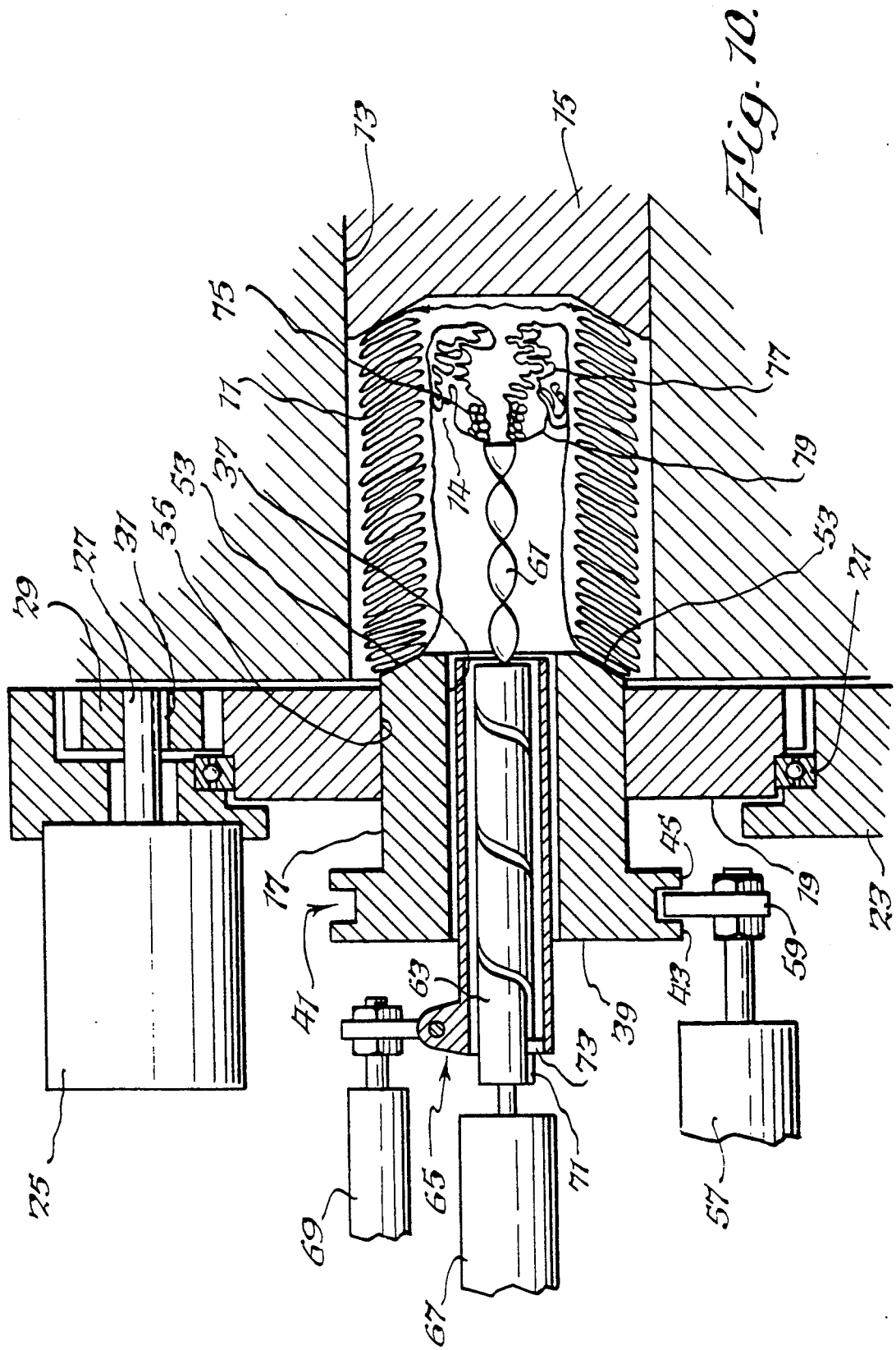
FIG. 10 shows the twist knot, as well as the wadding of casing material being compressed further into the bore of the shirred casing stick.

Referring to FIG. 10, it will be seen that cam key 73 has been moved back through the spiral portion of cam groove 71. Thus, as shown in FIG. 10, corkscrew means 61 has been turned in the reverse direction from that which it was turned to reach the position shown in FIGS. 8 and 9. This reverse direction turning has advanced corkscrew means 61 linearly into the bore of shirred casing stick 11.

As shown in FIG. 10, cam cylinder 63 is fully re-extended through cam follower tube 65 with cam key 63 being at the remote end of the linear portion of cam groove 71. As shown in FIG. 9, both cam cylinder 63 and cam follower tube 65 are extended to the position shown in FIGS. 1 through 4, with corkscrew means 61 being extended into the bore of shirred casing stick 11.

The extension of corkscrew means 61 has imposed direct force onto twist knot 75 and the surrounding portion of lock means 79, pushing it up into the center of wadding 77, further compressing wadding 77 and causing it to be forced further radially against the bore of shirred casing stick 11. This increases the friction between the wadding 77 and the bore of shirred casing stick 11, thus, increasing the degree of interference fit therebetween.

The further compression of wadding 77 and the increased interference fit between wadding 77 and the bore of shirred casing stick 11, combined with the natural resiliency of most casing materials, provide a shock absorber against which the impact force of the initial portion of extruding food emulsion, being stuffed through a stuffing horn into the casing, is absorbed. The result is that the frequency of blow-outs, of the casing material, on initial start-up of the equipment, are significantly reduced.

Once the initial contact is made by the extruding food emulsion with the wadding 77, if there is any inconsistency in the density or momentary interruptions in the flow, such are compensated for as the food emulsion is re-compressed by the additional force and pressure required to push the wadding 77, out of its interference fit with the bore of shirred casing stick 11, and to re-extend and fill the wadding 77 before the balance of the casing material of the shirred casing stick 11 is de-shirred. The re-compression of the food emulsion is very rapid, happening concurrent with the extruded material impacting on the wadding, followed by a quick pushing of the wadding 77 out of the bore of the shirred casing stick. The aperture in twist knot 75, through which corkscrew means 61 had extended, remains to release entrapped air and other gases from the casing as it is being stuffed.

At this point the end-closure of the present invention has been completely formed and shirred casing stick 11, with the end-closure therein, may be removed from hollow cylinder 13 by the withdrawal of location piston 15. Following this, a new shirred casing stick may be inserted into hollow cylinder 13 and the end-closure forming process begun again.

The food emulsion that ultimately is stuffed into the casing, which is now in the form of shirred casing stick 11, enters from that end which is opposite to the end-closure of the present invention, i.e. the tail end of the shirred casing stick 11. Referring to FIG. 10, it will be seen that the direction of entry of the food emulsion is from the right hand side, directed towards the left hand side of the drawing figure. The initial impingement of the food emulsion is onto the wadding 77. The impact of the food emulsion causes the wadding 77 to be driven towards the left hand side as shown in drawing FIG. 10. As the wadding 77 is driven towards the left hand side, the food emulsion causes it to pay out. A modest amount of additional force and pressure, in comparison to that which is required to de-shirr shirred casing stick 11, is required to drive the wadding 77, stuffed in the bore of shirred casing stick 11, out of that bore while concurrently re-extending it by filling it. This occurs before the static inertia of the shirred casing stick 11 is completely overcome. As has been implied previously, the wadding 77, including twist knot 75 and lock means 79, has been pushed, stuffed and somewhat wedged and lodged inside of the bore of shirred casing stick 11. The additional force, i.e., back pressure, needed to dislodge the wadding 77 from the bore of shirred casing stick 11, permits the food emulsion to compress to the point where, when the wadding 77 has been extended fully, the pressure is driven against twist knot 75 further aiding in its being held in position, and the initial portion of the packed food emulsion casing is usually sufficiently consistent and dense enough, being fully filled with food emulsion, such that it need not be opened and recycled. However, in the event that the initial portion of the food emulsion casing, as stuffed, needs to be reopened to recycle the initial portion of food emulsion, lock means 79 is readily stripped off of twist knot 75 and then twist knot 75 may easily be untwisted by hand to effect that removal. The aperture for the escape of air, which extends through twist knot 75, is rather small to begin with and is reduced even more in size by the food emulsion pressure against twist knot 75. Air and other gases can still escape, but the aperture is sufficiently small that food emulsion cannot escape.

As was mentioned before, of course, as shirred casing stick 11 is de-shirred it will normally be caused to go through a brake or sizing ring may be about the same inside diameter as the food emulsion stuffing horn. In their words, the brake or sizing ring may be about the same inside diameter as the bore of shirred casing stick 11 and being flexible as described above, or, perhaps, slightly smaller. Thus, the wadding 77, having a similar diameter to the bore of shirred casing stick 11, will readily pass through the brake or sizing ring, being pushed by the extruding food emulsion, without jamming and without causing any bursting or interruption.

The foregoing detailed description is an explanation of the preferred embodiment of the present invention, as well as the best mode presently known to the inventor. However, the scope of the present invention is not to be limited by the description of the preferred embodiment but rather is defined by the scope of the claims, following, which are appended hereto and hereby included in and made part of this specification by this reference.

What is claimed is:

1. A food emulsion casing end-closure for a strand of casing having two ends and a bore therethrough, comprising:
   a) a twisted knot of food emulsion casing material formed by a plurality of de-shirred folds of said strand located between the ends of said strand and proximate one end of said strand within said bore;
   b) lock means, of said casing material, for maintaining said twisted knot in a twisted form;
   c) a wad comprising extended casing material connecting said strand to said twisted knot, wherein said wad and said knot in combination provide an interference fit with respect to said bore wherein some degree of force is necessary to extract said combination from said bore due to frictional contact therebetween, said wad comprising an intermixture of both an inverted portion and a non-inverted portion of de-shirred casing material, said wad and said twisted knot having, extending therethrough, a gas relief aperture to facilitate gas escape from within the casing as it is being stuffed with food emulsion, wherein said inverted portion of said de-shirred casing material in conjunction with said non-inverted portion of said de-shirred casing material comprises said lock means to inhibit the untwisting of said twisted knot.

2. The invention of claim 1 wherein said wad functions as a shock absorber for the initial portion of food emulsion which is stuffed into the casing of said shirred casing stick, said wad functioning to enhance the consistency of said initial portion of said food emulsion which is stuffed into said casing as said wad is unstuffed, from said bore of said shirred casing stick and is concurrently extended.

3. The invention of claim 1 wherein said end-closure, and said casing adjacent to said end-closure, are stuffed with food emulsion, said wad having been extended in the process of stuffing said food emulsion into said end-closure and said casing adjacent thereto, said food emulsion applying pressure to said twisted knot and thus functioning to assist in maintaining it as an element of said end-closure.

4. The invention of claim 1 wherein the casing has a wall thickness in the range of about 0.0007" to about 0.001".

5. The invention of claim 2 wherein the casing has a wall thickness in the range of about 0.0007" to about 0.001".

6. The invention of claim 3 wherein said food emulsion is meat emulsion.

7. The invention of claim 5 wherein said food emulsion is meat emulsion.

8. The invention of claim 1 wherein the casing is edible.

9. The invention of claim 2 wherein the casing is edible.

10. The invention of claim 3 wherein the casing is edible.

11. The invention of claim 4 wherein the casing is edible.

12. The invention of claim 5 wherein the casing is edible.

13. The invention of claim 6 wherein the casing is edible.

14. The invention of claim 7 wherein the casing is edible.

15. A method of forming a stuffed and encased food emulsion product which comprises stuffing food emulsion into a shirred casing stick having a food emulsion end-closure wherein said end-closure comprises:
   a) a twisted knot of foot emulsion casing material formed by a plurality of de-shirred folds of said strand located between the ends of said strand and proximate one end of said strand within said bore;
   b) lock means, of said casing material, for maintaining said twisted knot in a twisted form;
   c) a wad comprising extended casing material connecting said strand to said twisted knot, wherein said wad and said knot in combination provide some significant degree of frictional contact both between adjacent portions of the wad and with the bore of said strand providing an interference fit between the wad and the bore, said wad comprising an intermixture of both an inverted portion and a non-inverted portion of de-shirred casing material, said wad and said twisted knot having, extending therethrough, a gas relief aperture to facilitate gas escape from within the casing as it is being stuffed with food emulsion, wherein said inverted portion of said de-shirred casing material in conjunction with said non-inverted portion of said de-shirred casing material comprises said lock means to inhibit the untwisting of said twisted knot.

16. A method of forming a food emulsion casing end-closure which comprises:
   a) rotating the fore-folds of a shirred casing stick to de-shirr and twist at least one fold of said shirred casing stick;
   b) engaging, by twisting, said at least one fold with corkscrew means maintained in a stationary position;
   c) twisting said at least one fold about said corkscrew means while said corkscrew means is maintained in a stationary position;
   d) withdrawing said corkscrew means axially away from said shirred casing stick, with said at least one fold twisted about said corkscrew means to form a twisted knot, while concurrently de-shirring a portion of said shirred casing stick and a portion of said fore-folds;
   e) forming lock means of said de-shirred fore-folds to maintain said twisted knot as such;
   f) rotating said corkscrew means in an opposite direction from that stated in c), above, to unthread said twisted knot from said corkscrew means;
   g) inserting said twisted knot, with said lock means engaged therewith, and the food emulsion casing attached thereto and adjacent thereto, into the bore of said shirred casing stick in an interference fit therebetween to form a wadding means within said bore of said shirred casing stick;
   h) compressing said wadding means to both provide shock absorbency, for the food emulsion as it initially enters and makes contact with the casing material of said shirred casing stick, and to further increase the degree of said interference fit.

17. The invention of claim 16 wherein the casing has a wall thickness in the range of about 0.0007" to about 0.001".

18. The invention of claim 16 wherein the casing is edible.

19. The invention of claim 17 wherein the casing is edible.

20. A food emulsion casing end-closure formed by a method comprising:
   a) rotating the fore-folds of a shirred casing stick to de-shirr and twist at least one fold of said shirred casing stick;
   b) engaging, by twisting, said at least one fold with corkscrew means;
   c) twisting said at least one fold about said corkscrew means while said corkscrew means is maintained in a stationary position;
   d) withdrawing said corkscrew means axially away from said shirred casing stick, with said at least one fold twisted about said corkscrew means to form a twisted knot while concurrently de-shirring a portion of .said shirred casing stick and a portion of said fore-folds;
   e) forming lock means of said de-shirred fore-folds to maintain said twisted knot as such;
   f) rotating said corkscrew means in an opposite direction from that stated in c), above, to unthread said twisted knot from said corkscrew means;
   g) inserting said twisted knot, with said lock means engaged therewith, and the food emulsion casing attached thereto and adjacent thereto, into the bore of said shirred casing stick in an interference fit therebetween to form a wadding means within said bore of said shirred casing stick;

h) compressing said wadding means to provide shock absorbency, for the food emulsion as it initially enters and makes contact with the casing material of said shirred casing stick, and to further increase the degree of said interference fit.

21. The invention of claim 20 wherein the casing has a wall thickness in the range of about 0.0007" to about 0.001".

22. The invention of claim 20 wherein the casing is edible.

23. The invention of claim 21 wherein the casing is edible.

24. A system for forming end-closures on food emulsion shirred casing sticks comprising:
 a) means for holding a shirred casing sticks in position and location;
 b) means for rotating the fore-folds of said shirred casing stick while twisting at least one fold of said shirred casing stick, de-shirred by said rotation of said fore-folds, and engaging said at least one fold with;
 c) corkscrew means adapted to form a twist knot of said at least one fold by engagement and manipulation thereof;
 d) means for forming lock means to maintain said twist knot as such;
 e) means for disengaging said corkscrew means from said twist knot to form a gas escape aperture therein;
 f) means for stuffing said twist knot and said lock means and casing material attached thereto into the bore of said shirred casing stick to form a wadding, said wadding which
 g) means for compressing said wadding and increasing the degree of interference fit between said wadding and said bore.

* * * * *

UNITED STATES PATENT AND TRADEMARK OFFICE
CERTIFICATE OF CORRECTION

PATENT NO. : 5,131,883
DATED : July 21, 1992
INVENTOR(S) : Ivo G.M. Hendriks and Johan Kwanten It is certified that error appears in the above-indentified patent and that said Letters Patent is hereby corrected as shown below:

Column 20, line 15, in claim 24, paragraph f), after "which" add

--is interference fitted with said bore; and--.

Signed and Sealed this

Fourteenth Day of September, 1993

Attest:

BRUCE LEHMAN

*Attesting Officer*   *Commissioner of Patents and Trademarks*